(12) United States Patent
Wakamiya et al.

(10) Patent No.: US 8,670,063 B2
(45) Date of Patent: Mar. 11, 2014

(54) FOCUS DETECTION APPARATUS AND FOCUS DETECTION METHOD

(75) Inventors: Daisuke Wakamiya, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/325,667

(22) Filed: Dec. 14, 2011

(65) Prior Publication Data

US 2012/0162493 A1 Jun. 28, 2012

(30) Foreign Application Priority Data

Dec. 28, 2010 (JP) ................................ 2010-293803

(51) Int. Cl.
*H04N 5/232* (2006.01)
(52) U.S. Cl.
USPC .......................................... 348/349; 348/350
(58) Field of Classification Search
USPC .............................. 348/345, 349, 350; 358/14
See application file for complete search history.

(56) References Cited

U.S. PATENT DOCUMENTS

| 8,477,233 B2 * | 7/2013 | Oikawa ......................... 348/350 |
| 2013/0258170 A1 * | 10/2013 | Tamaki ......................... 348/349 |
| 2013/0272646 A1 * | 10/2013 | Fish et al. ....................... 385/14 |

FOREIGN PATENT DOCUMENTS

| JP | 2004-012493 | 1/2004 |
| JP | 2007-333720 | 12/2007 |

* cited by examiner

*Primary Examiner* — Tuan Ho
(74) *Attorney, Agent, or Firm* — Cowan, Liebowitz & Latman, P.C.

(57) ABSTRACT

A focus detection apparatus comprises: an image sensor that receives images that are formed by light that passes through different pupil regions of a photographing optical system including a focus lens, and outputs a pair of image signals; a control unit that controls to acquire a pair of image signals from the image sensor at first and second lens positions of the focus lens; a conversion unit that, by multiplying a shift amount between a pair of images representing the pair of image signals by a conversion coefficient, converts the shift amount to a defocus amount; and a calculation unit that calculates the conversion coefficient based on displacement amounts of respective ones of the pair of images representing the pair of image signals acquired at the first and second lens positions, and a displacement amount of the focus lens from the first lens position to the second lens position.

7 Claims, 8 Drawing Sheets

FIG. 2

FOCUS DETECTION APPARATUS AND FOCUS DETECTION METHOD

BACKGROUND OF THE INVENTION

1. Field of the Invention

The present invention relates to a focus detection apparatus and a focus detection method.

2. Description of the Related Art

Conventionally, a focus detection method according to a so-called phase difference method is employed for image capturing apparatuses such as digital cameras. In this method, an image shift amount of a pair of image signals that are obtained on the basis of light transmitted through different exit pupil regions of a photographing lens is determined, and a defocus amount is determined based on the image shift amount that is determined. According to this focus detection method, it is necessary to correctly estimate a conversion coefficient that is used to convert an image shift amount to a defocus amount.

Further, when an operator is operating a camera, in order to comfortably feel an automatic focus detection (hereunder, referred to as AF) operation, the AF speed is also important in addition to the AF accuracy. To improve the AF speed, when AF is performed in a defocus state, it is necessary to enter an in-focus state with the least amount of AF operations possible. More specifically, since it is desirable that a detected defocus amount is near to the actual defocus amount, in this respect also it is important to accurately estimate the conversion coefficient.

A focus adjustment apparatus that corrects a conversion coefficient in a calibration mode in order to estimate the conversion coefficient with greater accuracy has been disclosed. According to a method described in Japanese Patent Laid-Open No. 2004-12493, prior to photographing, an operation is performed that corrects a conversion coefficient based on a difference between image shift amounts of two images acquired at a plurality of focusing lens positions and a predetermined defocus amount, and the obtained value is stored in the camera. At the time of photographing, an image shift amount is converted to a defocus amount using the corrected conversion coefficient. In this connection, according to Japanese Patent Laid-Open No. 2004-12493, since a multi-point distance measurement method that has a plurality of distance measurement regions inside a photographing region is adopted, correction of a conversion coefficient is performed for each distance measurement region.

However, there are many cases in which the pair of image signals do not match each other due to vignetting caused by the photographing lens, manufacturing variations, or looseness in the apparatus. Therefore, it is not always possible to accurately determine an image shift amount for correcting a conversion coefficient. In particular, according to the apparatus disclosed in Japanese Patent Laid-Open No. 2004-12493 in which a multi-point distance measurement method is adopted, there are cases in which the degree of matching between two images at the periphery of a photographing region is low and an image shift amount can not be determined, and consequently an accurate conversion coefficient can not be determined.

Japanese Patent Laid-Open No. 2007-333720 discloses technology in which, as a measure to counter vignetting caused by a photographing lens, shading correction is performed by multiplying data of pixels that receive light that has passed through one region of an exit pupil of a photographing lens by data of pixels of lines that are in the vicinity of the former pixels and receive light that has passed through the other region of the exit pupil. However, there is the problem that, in order to perform shading correction, the circuit scale is enlarged and the calculation times increase.

SUMMARY OF THE INVENTION

The present invention has been conceived in consideration of the above described problems, and the present invention is to enable, with a simple calculation, more accurate detection of a conversion coefficient that converts an image shift amount to a defocus amount.

According to the present invention, provided is a focus detection apparatus, comprising: an image sensor that receives light of respective images that are formed by light that passes through different pupil regions of a photographing optical system including a focus lens, and outputs a pair of image signals; a control unit that controls so as to acquire a pair of image signals from the image sensor at each of a first lens position and a second lens position, that are different positions to each other, of the focus lens; a conversion unit that, by multiplying a shift amount between a pair of images representing the pair of image signals that are output from the image sensor by a conversion coefficient, converts the shift amount to a defocus amount of the photographing optical system; and a calculation unit that calculates the conversion coefficient based on displacement amounts of respective ones of the pair of images representing the pair of image signals that are acquired at the first lens position and the second lens position, and a displacement amount of the focus lens from the first lens position to the second lens position.

Further, according to the present invention, provided is a focus detection method for a focus detection apparatus that comprises an image sensor that receives light of respective images that are formed by light that passes through different pupil regions of a photographing optical system including a focus lens, and outputs a pair of image signals, and that, by multiplying a shift amount between a pair of images representing the pair of image signals that are output from the image sensor by a conversion coefficient, converts the shift amount to a defocus amount of the photographing optical system, the method comprising: acquiring a pair of image signals from the image sensor at each of a first lens position and a second lens position, that are different positions to each other, of the focus lens; and calculating the conversion coefficient based on displacement amounts of respective ones of the pair of images representing the pair of image signals that are acquired at the first lens position and the second lens position, and a displacement amount of the focus lens from the first lens position to the second lens position.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a plan view that illustrates the configuration of a portion of an image sensor;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
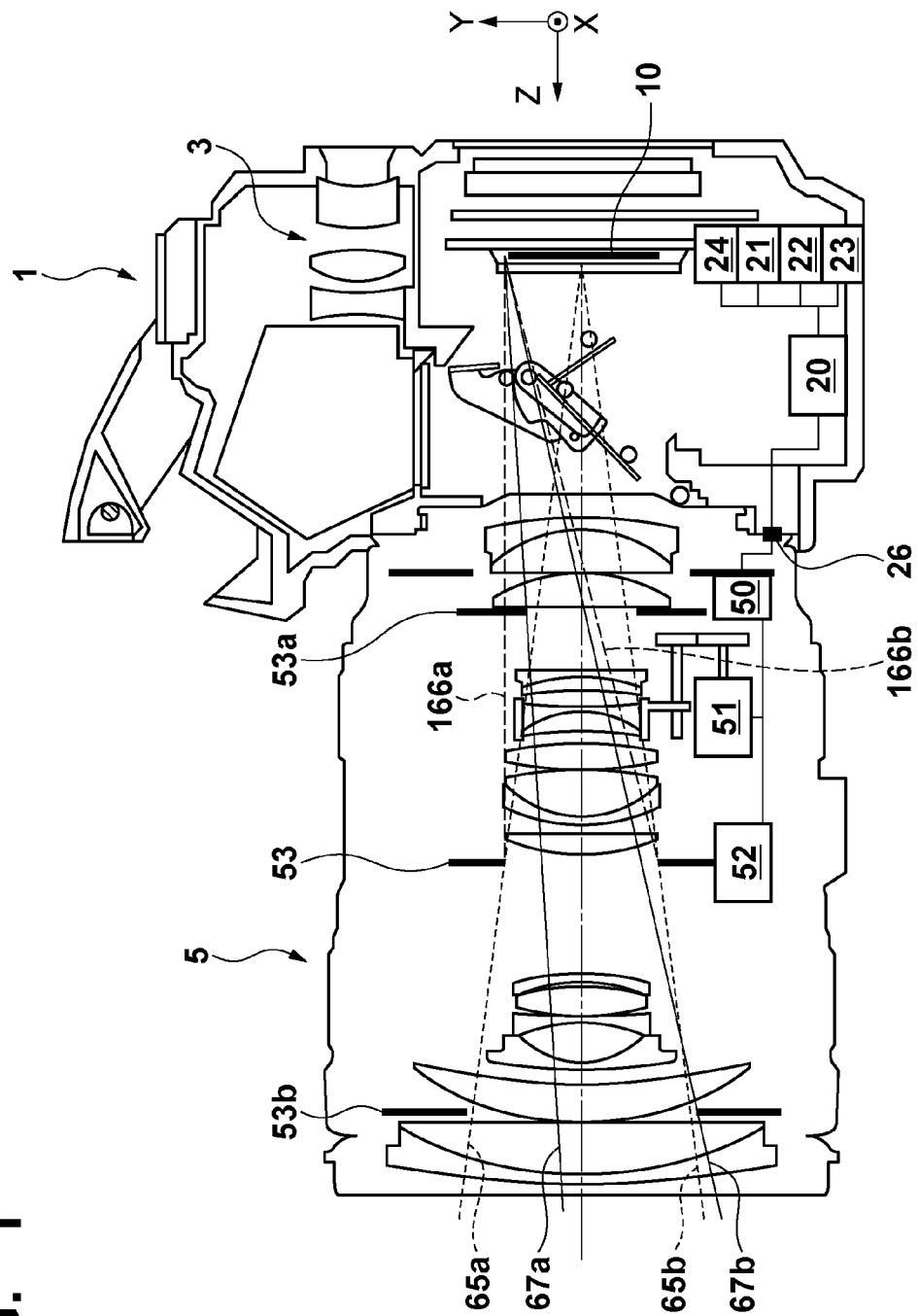
FIG. 1 is a schematic cross-sectional view of a digital still camera that is equipped with a focus detection apparatus according to a first embodiment.

FIG. 1 is a schematic cross-sectional view of a digital still camera that is equipped with a focus detection apparatus according to a first embodiment. In FIG. 1, reference numeral 1 denotes a camera body, reference numeral 10 denotes an image sensor (solid state image sensor) that is arranged on an expected image formation plane of a photographing lens (photographing optical system) 5. According to the first embodiment, some pixels among a large number of pixels that constitute the image sensor are replaced by focus detection pixels for detecting a focus state of the photographing lens 5 by a phase difference method.

Reference numeral 20 denotes a CPU that controls the entire camera. Reference numeral 21 denotes an image sensor control circuit that controls driving of the image sensor 10. Reference numeral 24 denotes an image processing circuit that performs image processing of image signals captured by the image sensor 10. Note that the CPU 20 performs control and calculations for determining a conversion coefficient K that is described later. Reference numeral 22 denotes a memory circuit that records images captured by the image sensor 10, and that can also record a distribution of received light of the image sensor 10. Reference numeral 23 denotes an interface circuit for outputting an image that has undergone image processing at the image processing circuit 24 to outside of the camera body 1. Reference numeral 3 denotes an ocular lens for observing a subject image.

The photographing lens 5 is a lens that is detachable from the camera body 1, and includes a focus lens. The photographing lens 5 receives focus adjustment information that is sent from the CPU 20 of the camera body 1 with a lens CPU 50 through an electrical contact 26, and is adjusted to an in-focus state by means of a photographing lens driving mechanism 51 based on the focus adjustment information.

Reference numeral 53 denotes a diaphragm that is disposed in the vicinity of a pupil of the photographing lens 5. The diaphragm 53 is configured to be narrowed to a predetermined diaphragm value by a diaphragm driving mechanism 52. Reference numeral 53a denotes a window frame that is provided so as to be closer to the image sensor 10 than the diaphragm 53. Reference numeral 53b denotes a window frame that is provided so as to be farther from the image sensor 10 than the diaphragm 53.

Reference numerals 165a and 165b denote light rays that are directed from the center of the image sensor 10 toward the diaphragm 53. Reference numerals 166a and 166b denote light rays that are directed from a point where an image height exists in the Y direction on the image sensor 10 toward the diaphragm 53. Reference numerals 167a and 167b denote light rays that are delimited by the window frames 53a and 53b among the light flux that is incident on the point at which the image height exists in the Y direction on the image sensor 10. In the example shown in FIG. 1, the light rays are not subject to vignetting by the window frames 53a and 53b at the center of the image sensor 10. However, at a position where the image height is high, the light rays at the top and the bottom of the window frames 53a and 53b may be subject to vignetting because the window frames 53a and 53b extend more inward than the light rays directed toward the diaphragm 53.

Figure 2:
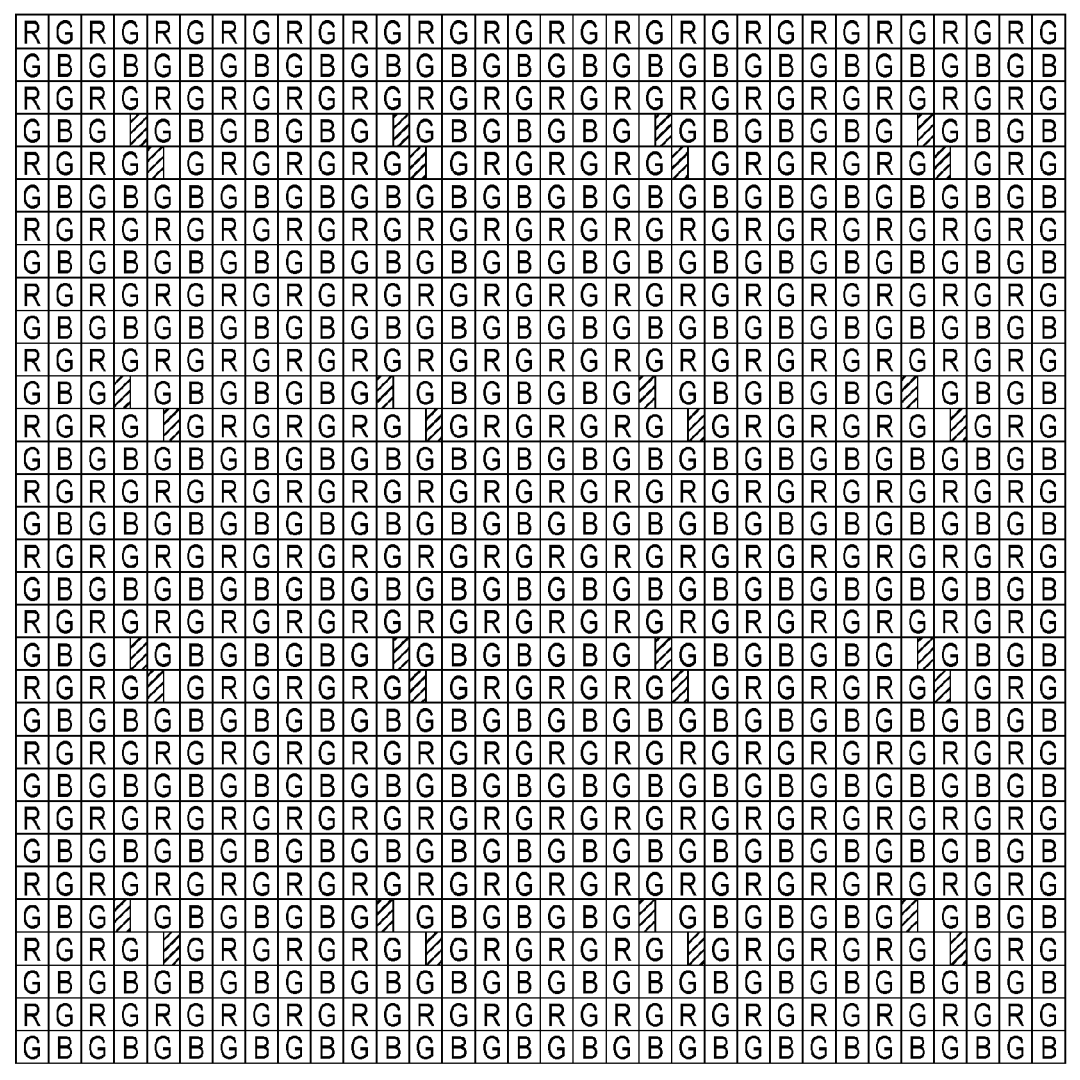

FIG. 2 is a plan view that illustrates the configuration of a portion of the image sensor 10. In FIG. 2, the characters R, G, and B represent the color of the color filter of each pixel. The pixels denoted by reference character R mainly transmit a red light component, the pixels denoted by reference character G mainly transmit a green light component, and the pixels denoted by reference character B mainly transmit a blue light component. The R, G, and B pixels are arranged according to a so-called Bayer array. Furthermore, pixels denoted by reference characters A and B are pixels for detecting the focus state of the photographing lens 5 (hereunder, referred to as focus detection pixels). As described later, an opening in the X-direction (transverse direction) is restricted in the focus detection pixels A and B, and light rays that pass through different pupil regions are incident thereon. The image recognition characteristics of humans are sensitive to brightness information. Hence, a degradation in image quality is readily perceptible when there is a shortage of G pixels, which are the main component of brightness information. On the other hand, R pixels and B pixels are pixels that acquire color information, and since the visual characteristics of humans are such that sensitivity to color information is low, a degradation in image quality is not readily perceived even if there is a shortage to some extent with respect in the pixels that acquire color information. Therefore, in the image sensor 10 of the first embodiment, focus detection pixels A and B that receive a light flux that is transmitted through a part of a pupil region of the photographing lens 5 are assigned to some positions where R and B pixels ought to be.

The focus detection pixels A and B are arranged adjacent to each other to make a distance therebetween as short as possible. This arrangement can minimize the possibility that the focus detection pixels A and B will receive light rays from different subjects, and reduces focus detection errors. In addition, the order of aligning the focus detection pixels A and B is reversed in even numbered lines and odd numbered lines. This arrangement is adopted in order to correspond to a case in which an edge portion in the vertical direction of a subject is at a boundary portion between the focus detection pixels A and B. Thus, even in a case in which an edge portion of a subject is at a boundary portion between the focus detection pixels A and B and the phase of images obtained from the focus detection pixels A and B shifts, the phase shift occurs simultaneously in both pixels. Furthermore, the shift amount is uniform and in opposite directions. Thus, in the present embodiment, a configuration is adopted so that focus detection errors cancel each other out by performing a correlation computation using at least two sets of lines that are adjacent in a direction that is perpendicular to the pupil-splitting direction. This corresponds to the fact that, when deciding the number of pairs of images as described later, an even number of image pairs is always specified. Thus, focus detection errors can be reduced.

Figure 3:
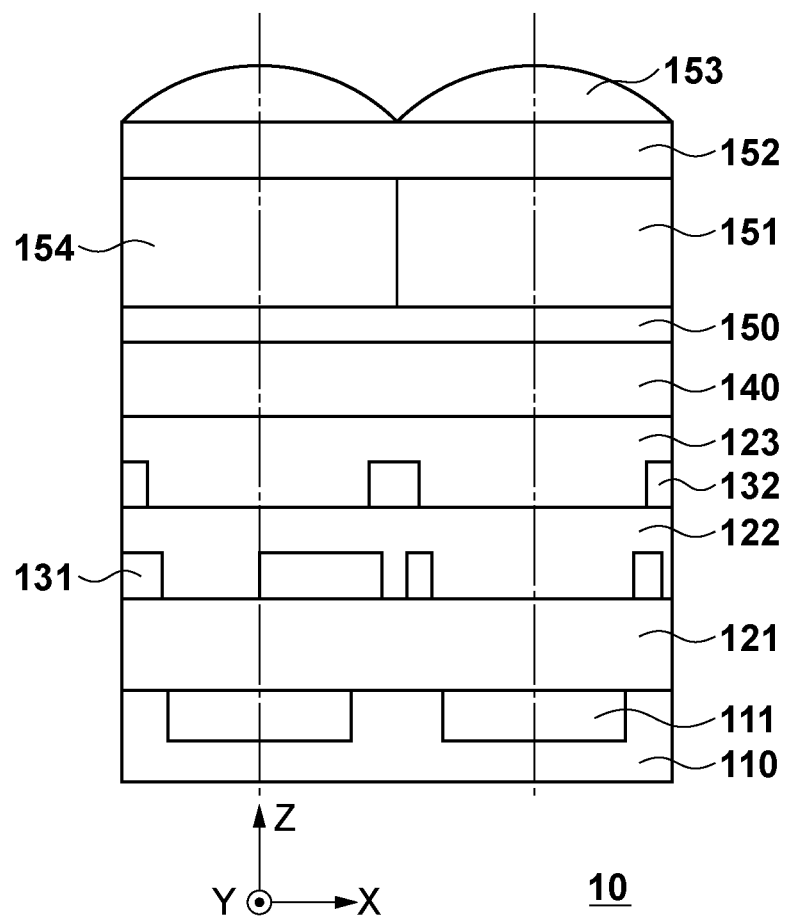
FIG. 3 is a schematic cross-sectional view of a focus detection pixel and a normal pixel.

FIG. 3 is a schematic cross-sectional view of the focus detection pixel A and a normal pixel in the image sensor 10 shown in FIG. 2. The pixel on the right side in FIG. 3 is a normal pixel that can receive a light flux that has been transmitted through the entire pupil region of the photographing lens 5. The pixel on the left side in FIG. 3 is the focus detection pixel A. Because the opening in the X-direction is restricted, the focus detection pixel A can receive only a light flux that has been transmitted through a portion of the photographing lens 5.

As shown in FIG. 3, a photoelectric conversion unit 111 is formed inside a silicon substrate 110. A signal charge that is generated with the photoelectric conversion unit 111 is output to the outside through an unshown floating diffusion unit, a first electrode 131, and a second electrode 132. An interlayer dielectric film 121 is formed between the photoelectric conversion unit 111 and the electrode 131. An interlayer dielectric film 122 is formed between the electrode 131 and the electrode 132. An interlayer dielectric film 123 is formed on the side on which light is incident of the electrode 132, and a passivation film 140 and a planarization layer 150 are formed thereon. On the side on which light is incident of the planarization layer 150, a color filter layer 151 is formed on the normal pixel, while a filter layer 154 that is constituted by a resin that does not absorb light and has a high transmittance is formed on the focus detection pixel A. Furthermore, a planarization layer 152 and a microlens 153 are formed thereon. In this case, the power of the microlens 153 is set such that the pupil of the photographing lens 5 and the photoelectric conversion unit 111 are substantially conjugate with each other. In a pixel positioned at the center of the image sensor 10, the microlens 153 is disposed at the center of the pixel. In a pixel positioned at a periphery of the image sensor 10, the microlens 153 is disposed so as to deviate to the optical axis side of the photographing lens 5.

Subject light that has passed through the photographing lens 5 is converged in the vicinity of the image sensor 10. Further, the light that has reached each of the pixels of the image sensor 10 is refracted by the microlens 153 and is further converged onto the photoelectric conversion unit 111. In the normal pixel on the right side in FIG. 3, the first electrode 131 and the second electrode 132 are arranged so as not to block incident light.

In contrast, in the focus detection pixel A on the left side in FIG. 3, a part of the electrode 131 is arranged so as to cover the photoelectric conversion unit 111. As a result, light flux that passes through a part of the pupil region of the photographing lens 5 can be received at the focus detection pixel A. In addition, in order to reduce a decrease in the output of the photoelectric conversion unit 111 due to the electrode 131 blocking a portion of the incident light flux, the filter layer 154 of the focus detection pixel A is formed with a resin that does not absorb light and has a high transmittance.

In this connection, the configuration of the focus detection pixel B is similar to the configuration of the focus detection pixel A that is shown in FIG. 3, except that the direction in which the electrode 131 covers the photoelectric conversion unit 111, that is, a region in which the photoelectric conversion unit 111 is exposed to light, is opposite to the configuration of the focus detection pixel A.

Figure 4A:
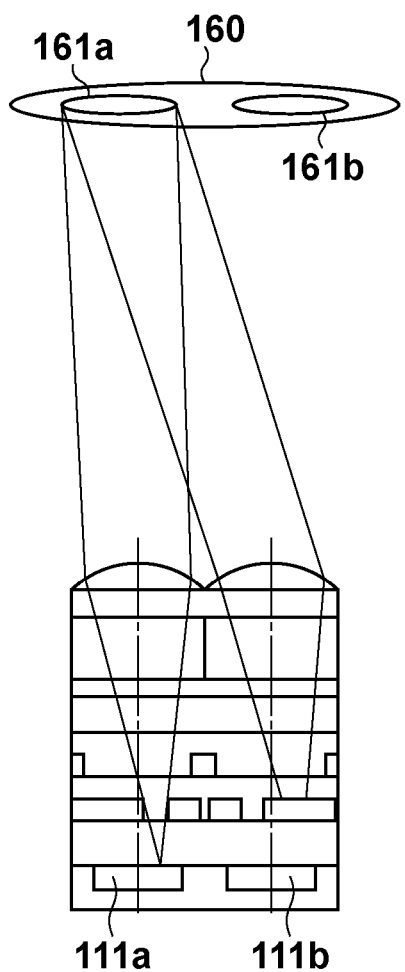
FIG. 4A and FIG. 4B are views that illustrate the relation between a light receiving region of a focus detection pixel and a pupil region of a photographing lens.
Figure 4B:
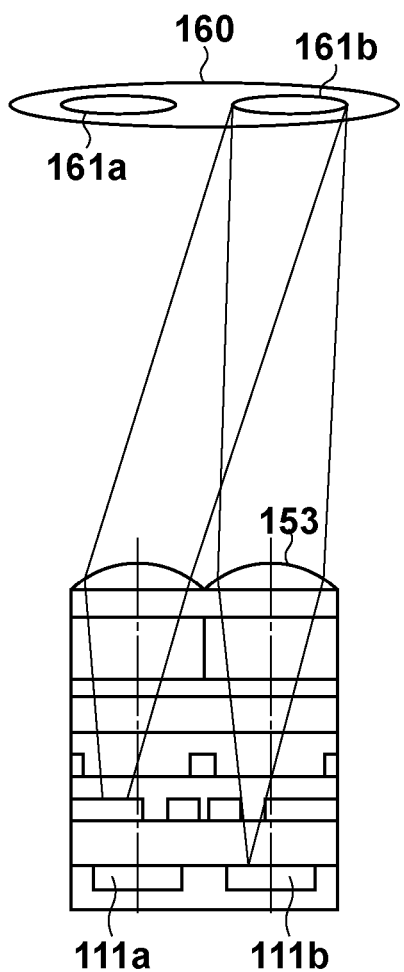

FIGS. 4A and 4B are drawings that show the relationship between the respective light receiving regions of the focus detection pixels A and B and the pupil region of the photographing lens 5. The pixel on the left side in FIGS. 4A and 4B corresponds to the focus detection pixel A, and the pixel on the right side in FIGS. 4A and 4B corresponds to the focus detection pixel B. In this connection, although, as shown in FIG. 2, the focus detection pixels A and B are not arranged side by side, for description convenience the focus detection pixels A and B are illustrated in a state in which the pixels are arranged side by side. Further, in FIGS. 4A and 4B, reference numeral 160 denotes a pupil region of the photographing lens 5 that is illustrated in a schematic manner, and reference numerals 111a and 111b denote a photoelectric conversion unit of the focus detection pixels A and B, respectively. FIG. 4A is a view that illustrates the optical path of a light flux that passed through a pupil region 161a. FIG. 4B is a view that illustrates the optical path of a light flux that passed through a pupil region 161b.

As shown in FIGS. 4A and 4B, the openings of the focus detection pixels A and B are provided so as to possess different eccentricities with respect to the optical axis of the microlens 153. Therefore, as shown in FIG. 4A, the light flux that passes through the pupil region 161a reaches the photoelectric conversion unit 111a of the focus detection pixel A, but does not reach the photoelectric conversion unit 111b of the focus detection pixel B. Conversely, as shown in FIG. 4B, the light flux that passes through the pupil region 161b reaches the photoelectric conversion unit 111b of the focus detection pixel B, but does not reach the photoelectric conversion unit 111a of the focus detection pixel A.

In the example described with reference to FIG. 2, FIG. 3, and FIGS. 4A and 4B, a case is illustrated in which a direction in which the pupil is split is the horizontal direction. However, the present invention is not limited thereto, and a configuration may also be adopted so as to acquire signals in a case in which the pupil is split in the vertical direction by providing the openings of the focus detection pixels A and B with different eccentricities at an upper portion and a lower portion with respect to the optical axis of the microlens 153.

Figure 5A:
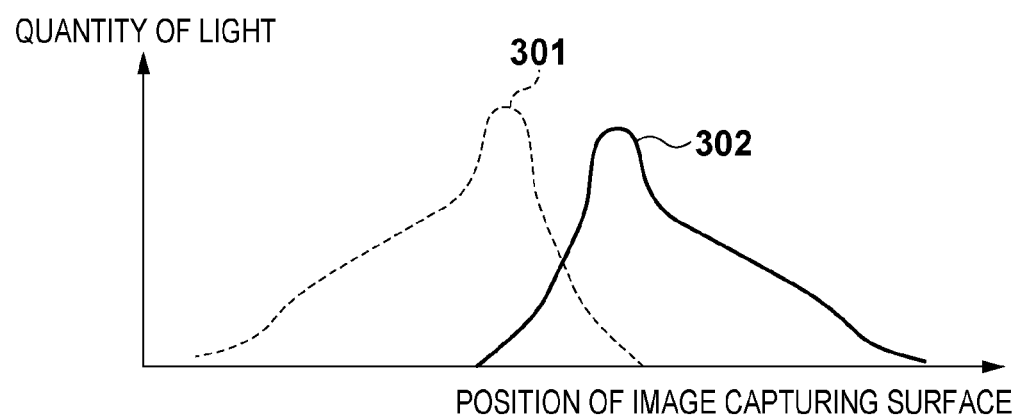
FIG. 5A and FIG. 5B are views that illustrate an example of images obtained from a focus detection pixel.

FIG. 5A illustrates an example of images obtained from the focus detection pixels A and B having the above described configurations, respectively. In FIG. 5A, reference numeral 301 denotes an example of an A image that is based on a signal output from the focus detection pixels A, and reference numeral 302 denotes an example of a B image that is based on a signal output from the focus detection pixels B. As shown in FIG. 5A, the A image and the B image are formed by light fluxes that have passed through different pupil regions, respectively, and are not the same shape due to vignetting caused by the photographing lens or variations in the microlens position. Consequently, when calculating an image shift amount between the A image and B image, normally image correction and shading correction are executed for the A image and B image, respectively, and after increasing the degree of matching between the images, the image shift amount is calculated by means of a correlation computation. A defocus amount is determined by multiplying the image shift amount obtained in this manner by a conversion coefficient K, and focus adjustment can be performed according to the phase difference method by driving the focus lens based on the defocus amount that is determined.

Next, a method of calculating the conversion coefficient K for converting from an image shift amount to a defocus amount according to the present embodiment is described with reference to FIG. 6.

Figure 6:
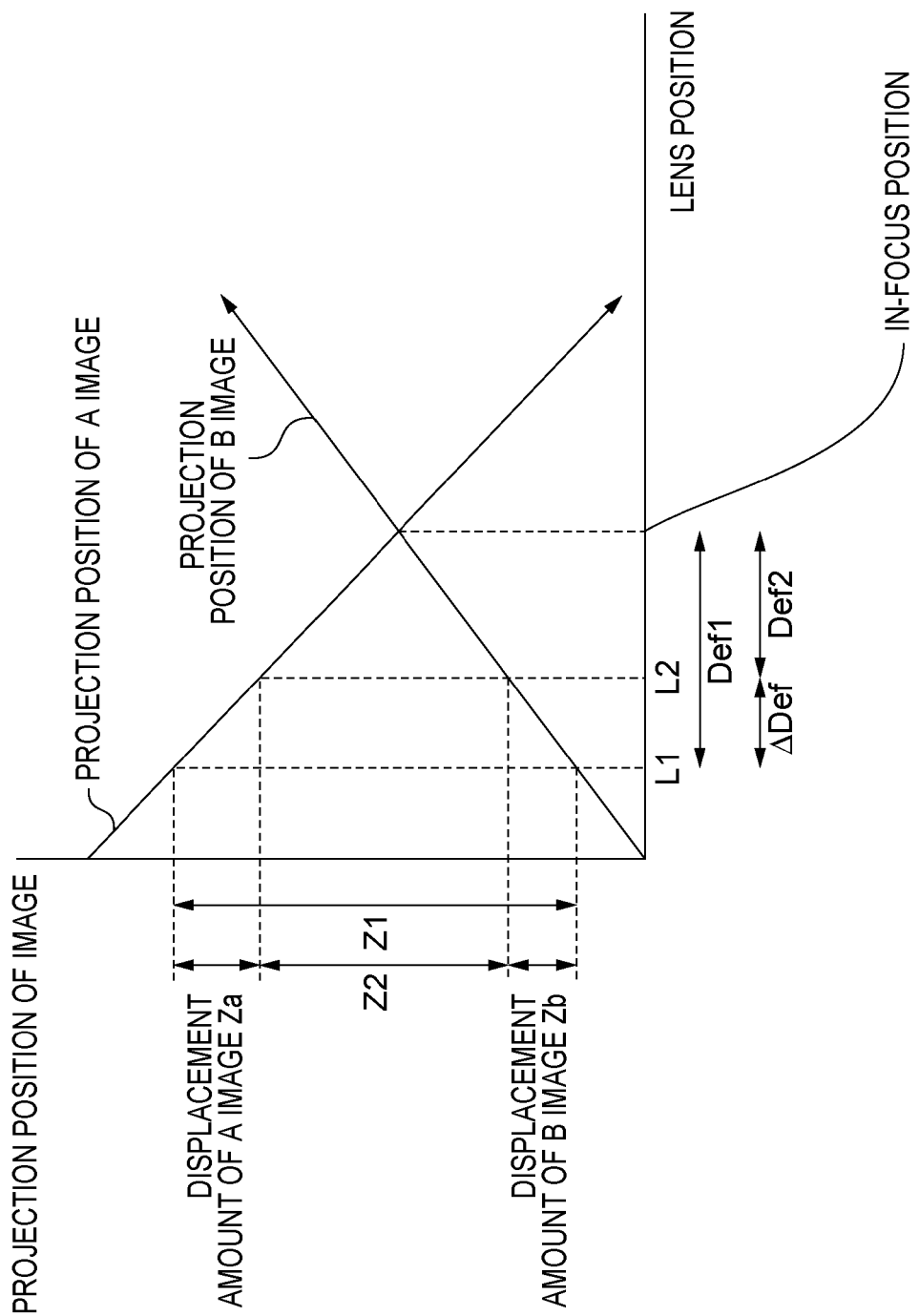
FIG. 6 is a view that illustrates the relation between an image shift and a lens position.

In FIG. 6, the abscissa represents a lens position of the focus lens, and the ordinate represents a projection position of an image that corresponds to a point of the same subject. On the left side of an in-focus position, an A image is projected on the upper side and a B image is projected on the lower side. As the focus lens position approaches the in-focus position, the projection position of the A image and the projection position of the B image become closer, and overlap at the in-focus position so that the image shift amount is 0.

A defocus amount that shows a displacement amount of the focus lens from a first lens position L1 to the in-focus position is denoted by Def1, and a defocus amount that shows a displacement amount of the focus lens from a second lens position L2 to the in-focus position is denoted by Def2. In this case, a displacement amount ΔDef of the focus lens from the first lens position L1 to the second lens position L2 is (Def1−Def2).

Further, an image shift amount between the A image and the B image at the first lens position L1 is denoted by Z1, and an image shift amount between the A image and the B image at the second lens position L2 is denoted by Z2. In this case, a difference between Z1 and Z2 on the upper side of the ordinate is a displacement amount of the A image in a case where the focus lens moved from the first lens position L1 to the second lens position L2. Similarly, a difference between Z1 and Z2 on the lower side of the ordinate is a displacement amount of the B image. Accordingly, the amount of change (Z1−Z2) in the image shift amount when the focus lens moved from the first lens position L1 to the second lens position L2 is equivalent to a sum of a displacement amount Za of the A image and a displacement amount Zb of the B image.

Here, if the image shift amount is taken as Z and the defocus amount is taken as Def, the conversion coefficient K is defined as shown in equation (1) below.

$$Def = KZ \quad (1)$$

Hence, when a defocus amount at the first lens position L1 is taken as Def1, an image shift amount at the first lens position L1 is taken as Z1, a defocus amount at the second lens position L2 is taken as Def2, and an image shift amount at the second lens position L2 is taken as Z2, the following relation can be expressed.

$$Def1 = KZ1 \quad (2)$$

$$Def2 = KZ2 \quad (3)$$

Here, if equation (3) is subtracted from equation (2), and a driving amount of the focus lens from the first lens position L1 to the second lens position L2 is taken as ΔDef, the following relation can be expressed.

$$\Delta Def = Def1 - Def2 = K(Z1 - Z2) \quad (4)$$

Here, since a difference Z1−Z2 in the image shift amounts when the focus lens moves from the first lens position L1 to the second lens position L2 is a sum of the displacement amount Za of the A image and the displacement amount Zb of the B image, the following equation (5) holds.

$$Z1 - Z2 = Za + Zb \quad (5)$$

Accordingly, based on equations (4) and (5), the following relation can be expressed.

$$\Delta Def = K(Za + Zb) \quad (6)$$

Thus, the conversion coefficient K can be calculated based on the following equation (7).

$$K = \Delta Def/(Za + Zb) \quad (7)$$

Although the defocus amount Def1 at the first lens position L1 and the defocus amount Def2 at the second lens position L2 are unknown amounts, since the driving amount ΔDef of the focus lens is known, the conversion coefficient K can be calculated by means of equation (7).

The advantage of using respective displacement amounts of the A image and the B image when the lens position of the focus lens is changed instead of using an image shift amount between the A image and the B image when determining the conversion coefficient K will now be described with reference to FIG. 5A and FIG. 5B. FIG. 5A shows the relation between the A image and the B image at a lens position of the focus lens. As described above, in FIG. 5A, the A image 301 and the B image 302 are formed by light fluxes that have passed through different pupil regions, respectively, and are not the same shape due to vignetting caused by the photographing lens 5 or variations in the microlens position. Consequently, when calculating an image shift amount with respect to the A image 301 and the B image 302, image correction and shading correction are executed with respect to the A image 301 and the B image 302, respectively, and after increasing the degree of matching between the images, the image shift amount is calculated by means of a correlation computation.

Figure 5B:
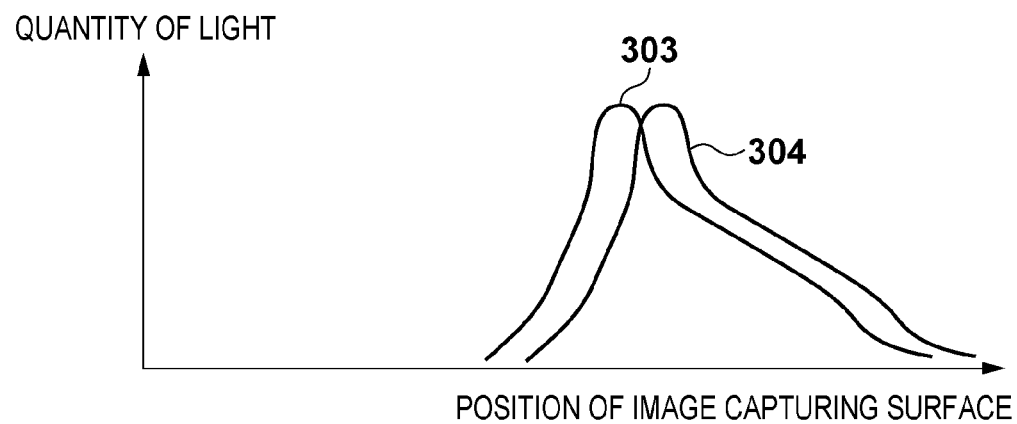

In contrast, FIG. 5B illustrates a displacement amount of the B image in a case where the focus lens moved from the first lens position L1 to the second lens position L2. In FIG. 5B, reference numeral 303 denotes a B1 image at the first lens position L1 and reference numeral 304 denotes a B2 image at the second lens position L2. Although there is some degree of difference in the shapes due to a change in the light quantity or the like caused by movement of the lens position, since the images being compared are both B images obtained based on light that passed through the same pupil region, the images have a similar shape. Consequently, determining a displacement amount by comparing the B1 image 303 and the B2 image 304 results in a smaller error in comparison to determining an image shift amount by comparing the A image 301 and the B image 302. Therefore, the result of the correlation computation is more accurate, and errors when calculating the conversion coefficient K can be reduced.

Thus, according to the present embodiment, a vast amount of data of the optical system and complex computational processing such as image correction and shading correction that had been performed to calculate the conversion coefficient K based on an image shift amount with respect to the A image and B image are no longer required. Further, since a conversion coefficient for converting an image shift amount to a defocus amount can be accurately determined by a simple computation, the speed and precision of focus detection can be improved. Furthermore, the present embodiment can be easily applied to various optical systems in which the configurations of interchangeable lenses and the like are different.

In the above description, an example is described in which an A image and a B image are acquired at two lens positions, namely, a first lens position and a second lens position, and the conversion coefficient K is calculated based on displacement amounts of the respective A and B images. However, the present invention is not limited thereto, and a configuration may also be adopted in which an A image and a B image are acquired at three or more lens positions, and the conversion coefficient K is determined utilizing the characteristics shown in FIG. 6.

Figure 7:
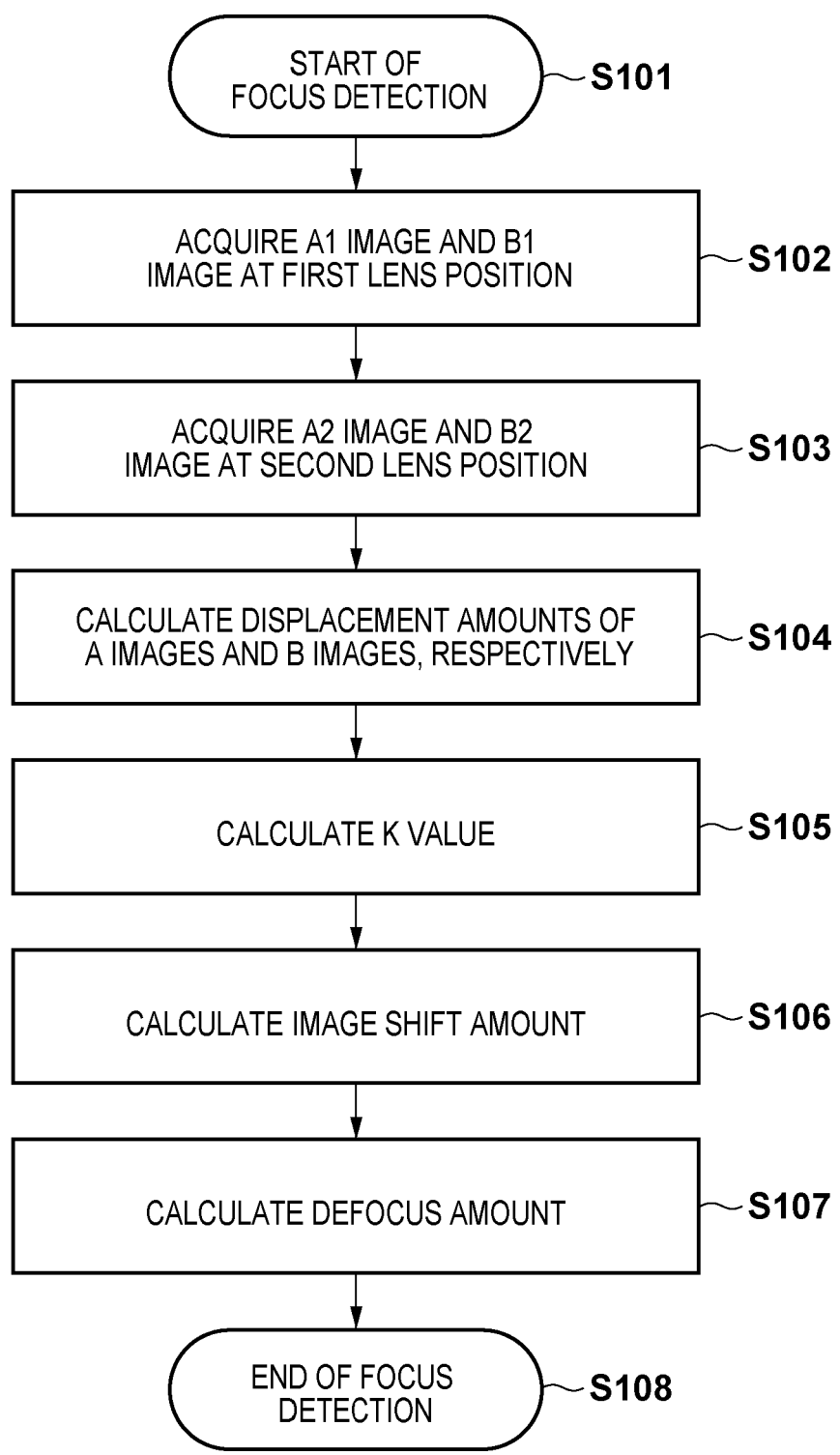
FIG. 7 is a focus detection flowchart according to the first embodiment.

Next, the focus detection method of the first embodiment is described according to the flowchart illustrated in FIG. 7.

In step S101, focus detection starts when a photographing preparation switch is turned on. In step S102, with the focus lens of the photographing lens 5 at the first lens position L1, an A1 image obtained from the focus detection pixels A and a B1 image obtained from the focus detection pixels B are acquired. In step S103, the focus lens of the photographing lens 5 is moved to the second lens position L2, and an A2 image and a B2 image are acquired in the same manner at the second lens position L2.

In step S104, a correlation computation is performed with respect to the A1 image and the A2 image, and the B1 image and the B2 image, respectively, that were acquired in steps S102 and S103, and a displacement amount Za of the A images obtained from the focus detection pixels A and a displacement amount Zb of the B images obtained from the focus detection pixels B are calculated. In step S105, using equation (7), a conversion coefficient K for converting the image shift amount to a defocus amount is calculated based on the determined displacement amounts Za and Zb and a displacement amount ΔDef from the first lens position L1 to the second lens position L2.

In step S106, an image shift amount between the A2 image and the B2 image at the second lens position L2 is calculated. For example, a distance Z2 between the respective centers of gravity A2g and B2g of the A2 image and the B2 image is calculated, and the distance Z2 is taken as the image shift amount at the second lens position L2. Note that the present invention is not limited by the method of determining an image shift amount, and a known method may be used. As one example, correlation values may be calculated while shifting the A2 image and the B2 image relative to each other, and a shift amount until the highest correlation value is reached may be taken as the image shift amount. Further, although a case is described herein in which an image shift amount is calculated using the A2 image and the B2 image because the focus lens is at the second lens position L2 at the time of executing step S106, the A1 image and the B1 image acquired at the first lens position L1 may also be used. Alternatively, an A image and a B image may be acquired again after moving the focus lens to another lens position, and an image shift amount between the acquired two images may be calculated.

Further, in step S102, an image shift amount Z1 at the first lens position L1 may be calculated in advance based on the A1 image and the B1 image. In this case, a difference between the image shift amount Z2 at the first lens position L1 and an image shift amount Z2 at the second lens position L2 obtained by equation (5) is theoretically equal to a sum of the displacement amount Za of the A images and the displacement amount Zb of the B image determined in step S105. Therefore, if the respective computational results described above differ by a certain value or more, it is regarded that there is a significant error in either the image shift amount Z1 at the first lens position L1 or the image shift amount Z2 at the second lens position L2, or in both of these image shift amounts. In this case, calculation of the center of gravity position of each image may be corrected and the image shift amounts recalculated, and if equation (5) is satisfied, the value may be taken as the image shift amount.

In step S107, a defocus amount is calculated based on the conversion coefficient K calculated in S105 and the image shift amount calculated in S106. The defocus amount at the second lens position L2 can be calculated utilizing equation (3). In a case where the focus lens has been moved to the first lens position L1 or another focus lens position in S106 also, a defocus amount at any lens position can be determined in a similar manner by substituting the respective calculation values into equation (1). In step S108, the focus detection ends.

According to the above described first embodiment an example is described in which two images are acquired based on light that has passed through different pupil regions using focus detection pixels disposed inside the image sensor 10. However, the present invention is not limited thereto, and the present invention can also be applied in a case where a pair of image sensors for focus detection is provided.

Second Embodiment

Next, a second embodiment of the present invention is described. The basic configuration of a camera according to the second embodiment is the same as the above described first embodiment, and hence a description thereof is omitted here.

Figure 8:
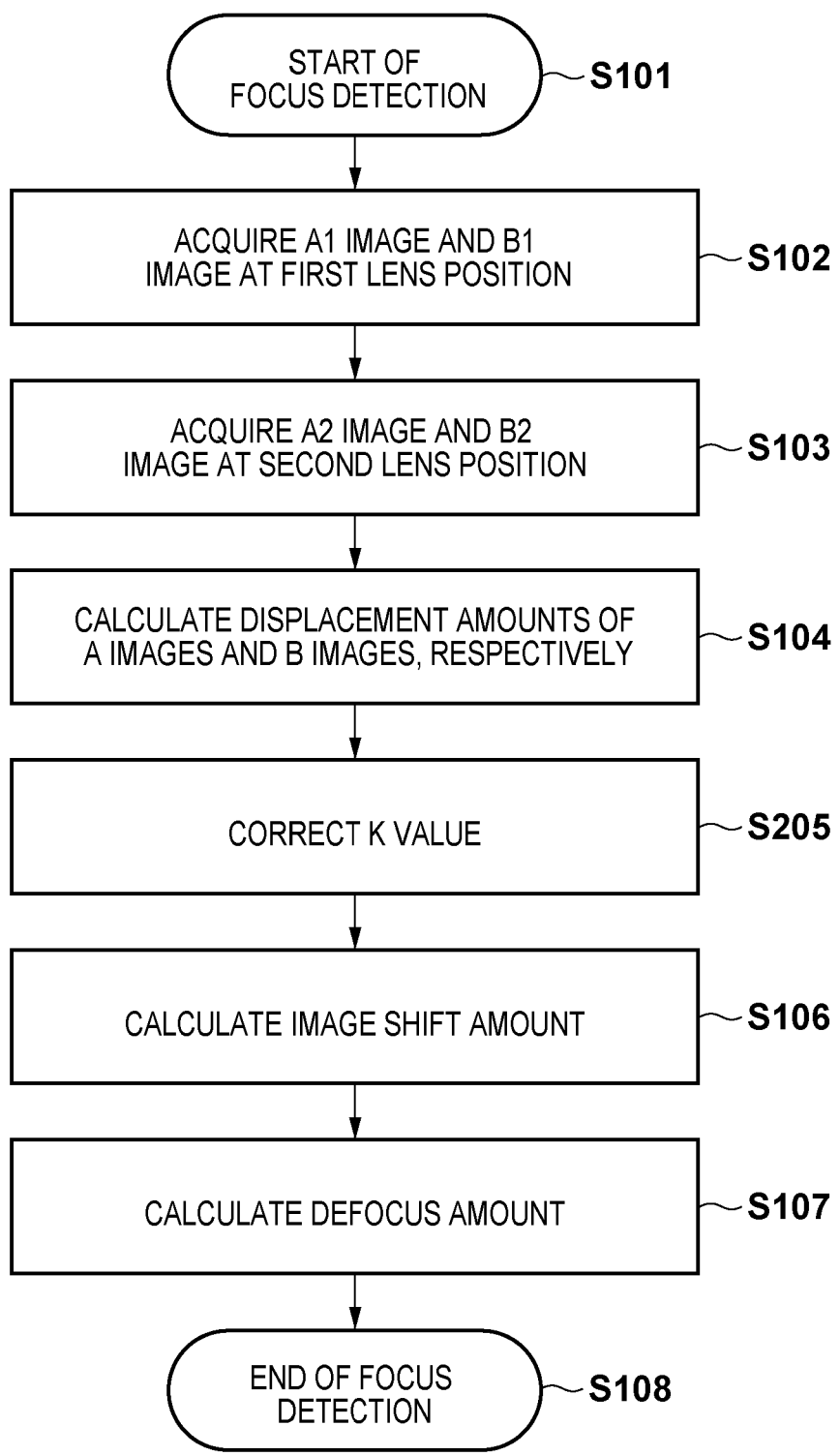
FIG. 8 is a focus detection flowchart according to a second embodiment.

FIG. 8 is a flowchart that illustrates focus detection processing according to the second embodiment. In FIG. 8, steps in which the same operations as in the processing described with reference to FIG. 7 in the first embodiment are performed are denoted by the same step numbers. The difference between the processing shown in FIG. 8 and the processing shown in FIG. 7 is that, instead of step S105 in the processing of FIG. 7, the processing illustrated in FIG. 8 includes step S205 in which processing is performed that corrects the conversion coefficient K. In step S205, first, the conversion coefficient K that has been stored in advance in an unshown memory is read out. This value is defined as Km. Next, similarly to step S105, the conversion coefficient K is recalculated based on the displacement amount ΔDef of the focus lens of the photographing lens 5 and a sum (Za+Zb) of the respective displacement amounts of the A images and B images. This value is defined as Kc. If a difference between Km and Kc is a value that is greater than or equal to a fixed value, it is assumed that there is an error in the Km value that has been stored in the memory, and therefore the conversion coefficient K is corrected. According to the second embodiment, K is corrected, for example, by the following equation (8), where a is a coefficient from 0 to 1.

$$K=\alpha Km+(1-\alpha)Kc \qquad (8)$$

The defocus amount is calculated in step S106 and subsequent steps using the conversion coefficient K that is calculated by equation (8). Further, the conversion coefficient K calculated by equation (8) may be stored in the memory and referred to as Km when next performing a focus detection operation. By correcting the conversion coefficient K in the above manner, a more accurate conversion coefficient K can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293803, filed on Dec. 28, 2010 which is hereby incorporated by reference herein in its entirety.

What is claimed is:
1. A focus detection apparatus, comprising:
an image sensor that receives light of respective images that are formed by light that passes through different pupil regions of a photographing optical system including a focus lens, and outputs a pair of image signals;
a control unit that controls so as to acquire a pair of image signals from said image sensor at each of a first lens position and a second lens position, that are different positions to each other, of said focus lens;
a conversion unit that, by multiplying a shift amount between a pair of images representing the pair of image signals that are output from said image sensor by a conversion coefficient, converts the shift amount to a defocus amount of said photographing optical system; and a calculation unit that calculates the conversion coefficient based on displacement amounts of respective ones of the pair of images representing the pair of image signals that are acquired at the first lens position and the second lens position, and a displacement amount of said focus lens from the first lens position to the second lens position.

2. The focus detection apparatus according to claim 1, wherein when the conversion coefficient is taken as K, displacement amounts of the respective ones of the pair of images representing the pair of image signals that are acquired at the first lens position and the second lens position are taken as Za and Zb, respectively, and a displacement amount from the first lens position to the second lens position is taken as ΔDef, said calculation unit calculates the conversion coefficient by means of the following equation:

$$K=\Delta Def/(Za+Zb).$$

3. The focus detection apparatus according to claim 1, further comprising:

a storage unit that stores a conversion coefficient that is calculated by said calculation unit;

a comparison unit that compares a conversion coefficient that is stored in said storage unit and a conversion coefficient that is newly calculated after the conversion coefficient that is stored in said storage unit by said calculation unit;

a correction unit that corrects the conversion coefficient stored in said storage unit in a case where a difference between the conversion coefficient stored in said storage unit and the conversion coefficient that is newly calculated by said calculation unit is equal to or greater than a value that is previously set;

wherein, when the conversion coefficient stored in said storage unit is taken as Km and a conversion coefficient that is newly calculated by said calculation unit is taken as Kc, said correction unit corrects the conversion coefficient by means of the following equation:

$$K=\alpha Km+(1-\alpha)Kc, 0\leq\alpha\leq1$$

4. The focus detection apparatus according to claim 1, further comprising:

a computing unit that calculates shift amounts between the pair of images representing the pair of image signals acquired at the first lens position and at the second lens position;

wherein when a difference between the shift amounts that are calculated by said computing unit and a sum of the displacement amounts of the respective ones of the pair of images representing the pair of image signals acquired at the first lens position and the second lens position is greater than a value that is previously determined, said computing unit re-calculates shift amounts.

5. A focus detection method for a focus detection apparatus that comprises an image sensor that receives light of respective images that are formed by light that passes through different pupil regions of a photographing optical system including a focus lens, and outputs a pair of image signals, and that, by multiplying a shift amount between a pair of images representing the pair of image signals that are output from said image sensor by a conversion coefficient, converts the shift amount to a defocus amount of said photographing optical system, the method comprising:

acquiring a pair of image signals from said image sensor at each of a first lens position and a second lens position, that are different positions to each other, of said focus lens; and calculating the conversion coefficient based on displacement amounts of respective ones of the pair of images representing the pair of image signals that are acquired at the first lens position and the second lens position, and a displacement amount of said focus lens from the first lens position to the second lens position.

6. The focus detection method according to claim 5, wherein when the conversion coefficient is taken as K, displacement amounts of the respective ones of the pair of images representing the pair of image signals that are acquired at the first lens position and the second lens position are taken as Za and Zb, respectively, and a displacement amount from the first lens position to the second lens position is taken as ΔDef, in said calculation process the conversion coefficient is calculated by means of the following equation:

$$K=\Delta Def/(Za+Zb).$$

7. The focus detection method according to claim 5, further comprising:

storing a conversion coefficient that is calculated in said calculation step in a storage unit;

newly calculating a conversion coefficient again;

comparing the conversion coefficient that is stored in said storage unit and the newly calculated conversion coefficient; and correcting the conversion coefficient stored in said storage unit in a case where a difference between the conversion coefficient stored in said storage unit and the newly calculated conversion coefficient is equal to or greater than a value that is previously set;

wherein, when the conversion coefficient stored in said storage unit is taken as Km and the newly calculated conversion coefficient is taken as Kc, the conversion coefficient is corrected by means of the following equation:

$$K=\alpha Km+(1-\alpha)Kc, 0\leq\alpha\leq1.$$

* * * * *